G. HOLMEN.
PRESSURE REGULATING VALVE.
APPLICATION FILED NOV. 10, 1910.
990,557.
Patented Apr. 25, 1911.
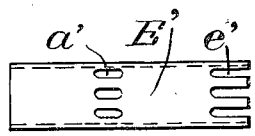
Fig. 5.
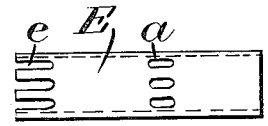
Fig. 6.
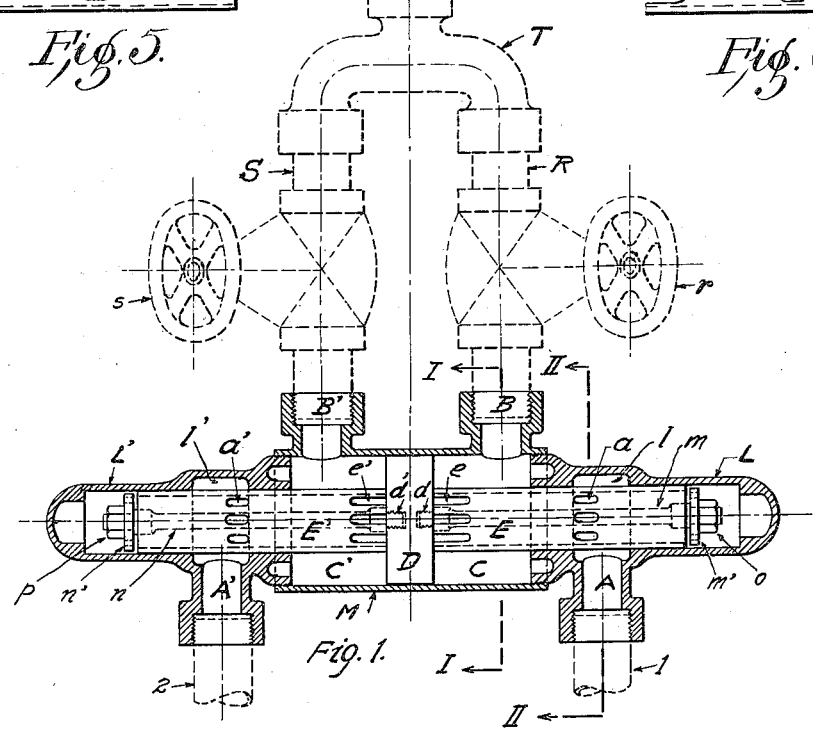
Fig. 1.
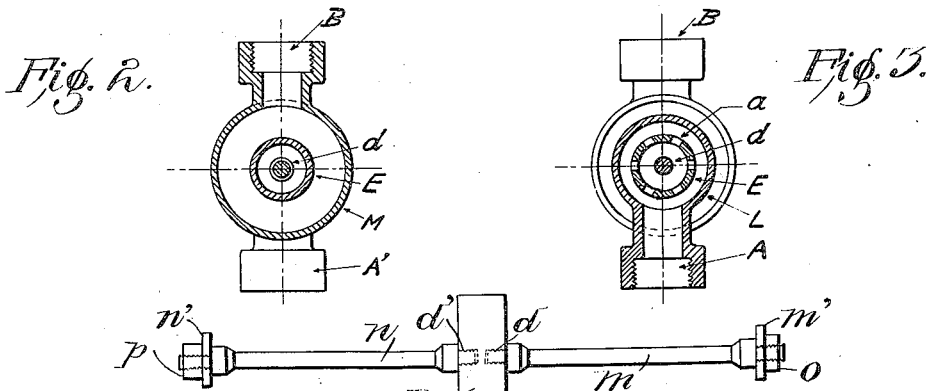
Fig. 2.
Fig. 3.
Fig. 4.
WITNESSES:
INVENTOR
Gustav Holmen

UNITED STATES PATENT OFFICE.

GUSTAV HOLMEN, OF TOMPKINSVILLE, NEW YORK.

PRESSURE-REGULATING VALVE.

990,557.

Specification of Letters Patent. Patented Apr. 25, 1911.

Application filed November 10, 1910. Serial No. 591,628.

*To all whom it may concern:*

Be it known that I, GUSTAV HOLMEN, a subject of the King of Norway, and residing at Tompkinsville, Staten Island, in the county of Richmond and State of New York, have invented certain new and useful Improvements in Pressure-Regulating Valves, of which the following is a specification.

My invention relates to pressure regulating valves, and the object of my invention is to produce a valve of this kind, which is simple in construction and operation and is especially adapted to be used in connection with hot and cold water supply pipes of a shower bath, or the like.

The valve is intended to automatically balance the pressures of the hot and cold water, in case the pressure in one of the supply pipes should be suddenly reduced, as often happens, where a greater number of pipes are connected to one main line. Without the arrangement of such a regulating means a uniform temperature of the water flowing from the common outlet pipe, to which the hot and cold water supply pipes are connected, can not be maintained, and for this reason my valve is so constructed and arranged that at all times a uniform temperature at the hot and cold water outlet will be maintained.

In the drawing, in which I have illustrated the preferred construction of my valve, Figure 1 is a central longitudinal section through the same, showing the connection of the hot and cold water outlet to a common outlet pipe; Fig. 2 is a section on line I—I and Fig. 3 a section on line II—II of Fig. 1, both sections viewed in the direction of the arrow, shown in Fig. 1. Fig. 4 is a detail, showing the piston with its connections; Figs. 5 and 6 are details, showing the sections of the tube, forming a part of the valve.

The casing of my new valve is composed of three parts, viz., the central cylindrical part M and the end parts L, L', which are screwed into the ends of the said central part, or are otherwise fastened thereto. The said parts L and L' are provided with inlet openings A and A' respectively which openings are provided with means, such as a female screw-thread to receive the male thread at the end of the hot and cold water supply pipes 1 and 2 respectively.

The valve proper comprises a tube composed of two sections E, E' (Figs. 5 and 6) and a piston D. The tube sections are guided in the end portions L and L' of the valve casing and are provided near their outer ends with apertures $a$ and $a'$ respectively. At their inner ends the tube sections are provided with open slots $e$ and $e'$, which slots are located on both sides of the piston D, which is fitted snugly in the cylindrical casing M and is adapted to move longitudinally therein. In the position of the tube shown in Fig. 1, the apertures $a$, $a'$ open into the chambers $l$ and $l'$ respectively, formed in the end portions L and L' respectively of the valve casing. The apertures $e$ and $e'$ open into large chambers C and C' respectively, provided in the central portion M of the valve casing.

The piston D is mounted between the tube sections E, E' in such a way, as to be independently movable thereof. On both sides the piston D is provided at its center with threaded bores $d$ and $d'$ respectively, into which bores rods $m$ and $n$ respectively are screwed. At their outer ends the rods $m$, $n$ carry washers $m'$ and $n'$ respectively, which are held on the rods by nuts $o$ and $p$ respectively, in a position adjacent to the outer ends of the tube sections.

The middle portion M of the valve casing is provided with the outlets B and B', to which outlets are secured by means of screw threads, or other suitable means, outlet pipes R and S respectively. These pipes are provided with hand valves $r$ and $s$ respectively and the pipes are both connected to a fitting T, to which a common outlet pipe U, leading to the shower bath, or the like, is secured.

The operation of the device is as follows: The hot water enters, say, through pipe 1 and inlet A into the chamber $l$, provided in the end portion L of the valve-casing, whereas the cold water enters, say, through pipe 2 and inlet A' into the chamber $l'$, provided in the other end portion L' of the valve-casing. Both hot and cold water pass through the openings $a$ and $a'$ respectively into the tube sections and through said sections and out through the openings $e$ and $e'$ respectively into the chambers C and C' respectively and then out through the outlets B and B' respectively into the pipes R and S respectively and through said pipes into the fitting T and the common outlet pipe U, where the hot and cold water mingle. Of course, both hand-valves $r$ and $s$ are open. It is assumed, that both the hot and cold water entering through the supply pipes 1 and 2 respectively, have the same pressure, and the piston D, therefore, being subjected on both sides to equal pressures, will be held in the position shown in Fig. 1. The hot and cold water entering the tube sections through the openings a and a' respectively, will also flow out at the open ends of the tube sections, exerting a certain pressure upon the washers m' and n' respectively. The area on the sides of the piston D being much larger, however, than the area of the washers, the counter pressure exerted by the water that flows out at the end of the tube sections will not be great, and, moreover, will be balanced by the pressure at the back of said washers. If, however, for some reason or other, the pressure, say, in the hot water supply-pipe 1 becomes suddenly reduced, less hot water will enter the chamber C and, a greater pressure will be exerted on the left-hand side of the piston D, due to the larger amount of cold water entering the chamber C' through the supply pipe 2. Consequently, the piston D will be moved toward the right hand side (Fig. 1) and by means of the washer n', fastened to the end of the rod n, the tube sections will be moved together with the piston D. As seen from Fig. 1, this movement of the tube sections will cause the apertures a' to be partly closed and hence, less cold water can pass into the tube section E' and into the chamber C'. Nearly the same proportion of hot and cold water flowing through the valve into the outlet pipes R and S respectively, will be maintained, and no change in the temperature of the water flowing out through the common outlet pipe U will occur. The piston D and the tube sections will be held in this position, into which they have been moved by the greater pressure on the left-hand side of the piston, until the pressure in the hot water supply pipe is restored, when the piston D and the tube sections will again be moved to their original positions shown in Fig. 1.

Should the pressure in the cold water supply pipe 2 become suddenly reduced, the piston D and tube sections would be moved in a reverse direction with the same results.

The piston D, instead of being mounted so as to be independently movable of the tube sections, may also be fastened to the tube sections, in which case the rods m and n and the washers m' and n' attached at the end thereof, could be omitted. I wish it distinctly understood that also other changes may be made in the construction of my new valve, without departure from the spirit of my invention, the drawing, as has already been pointed out, showing the preferred construction.

I claim:—

1. In a pressure regulating valve for two or more fluids the combination with the valve casing having inlets and outlets for said fluids, of a movable tube comprising two sections guided in said casing each section being provided with admission and discharge openings, and a piston between said sections, subjected on its sides to the pressure of the respective fluids and adapted to cause the movement of said tube sections upon a reduction in pressure on either side of said piston, thereby limiting the size of admission openings in one of said tube sections.

2. In a pressure regulating valve for two or more fluids the combination with the valve casing having two inlets and two outlets, of a movable tube comprising two sections guided in the ends of said casing each section being provided with admission and discharge openings, and a piston between said sections, subjected on its sides to the pressure of the respective fluids and adapted to cause the movement of said tube sections upon a reduction in pressure on either side of said pistons, thereby limiting the size of admission openings in one of said tube sections.

3. In a pressure regulating valve for two fluids, the combination with the valve casing having two inlets and two outlets for said fluids, of a movable tube comprising two sections guided in said casing each section being provided with admission and discharge openings, a movable piston between said sections, subjected on its sides to the pressure of the respective fluids, and means connected with said piston adapted to transmit any movement thereof to the said tube sections upon the reduction in pressure on either side of said piston, thereby limiting the size of admission openings in one of said tube sections.

4. In a pressure regulating valve for two fluids, the combination with the valve casing having two inlets and two outlets for said fluids, of a movable tube comprising two sections guided in said casing each section being provided with admission and discharge openings, a movable piston between said sections, subjected on its sides to the pressure of the respective fluids, a rod secured to each side of said piston and a washer fastened to the end of each rod near the outer end of each tube section, said rods and washers adapted to transmit any movement of the said piston to the said tube sections upon the reduction in pressure on either side of said piston, thereby limiting the size of admission openings in one of said tube sections.

5. In a pressure regulating valve for two or more fluids, the combination with the valve-casing, provided with inlets and outlets for each fluid, of a tube, movably guided in said casing and provided with admission and discharge openings corresponding to the inlet and outlet for each of the fluids, and a movable piston located between each set of admission and discharge openings in the said tube and subjected on the sides to the pressure of the respective fluids and adapted to cause the movement of said tube upon a reduction in pressure upon either side of said piston, thereby limiting the size of the admission openings to one of said fluids.

In testimony whereof I affix my signature in presence of two witnesses.

GUSTAV HOLMEN.

Witnesses:
 ALFRED MILLER,
 L. H. STAADEN.